United States Patent
Gammon et al.

(10) Patent No.: US 9,750,344 B2
(45) Date of Patent: *Sep. 5, 2017

(54) TABLE BENCHING APPARATUS AND METHODS OF USING THE SAME

(71) Applicant: Workrite Ergonomics, LLC, Petaluma, CA (US)

(72) Inventors: Erik Alexander Gammon, Penngrove, CA (US); Ruby Schaefer, Novato, CA (US); Oky Sulistio, Sonoma, CA (US); Alexander Justin Hautau, Novato, CA (US); John E. Johnston, Mill Valley, CA (US); Darren S. Hulsey, Santa Rosa, CA (US); Charles F. Lawrence, Novato, CA (US); David Warren Dean, Glen Ellen, CA (US); Derek Aaron Timm, Windsor, CA (US); Cody Ralph Darwin, San Rafael, CA (US)

(73) Assignee: Workrite Ergonomics, LLC, Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,719

(22) Filed: Apr. 24, 2017

(65) Prior Publication Data

US 2017/0224109 A1     Aug. 10, 2017

Related U.S. Application Data

(63) Continuation of application No. 14/870,371, filed on Sep. 30, 2015, now Pat. No. 9,655,445.

(51) Int. Cl.
*A47B 57/00* (2006.01)
*A47B 87/00* (2006.01)
*A47B 9/20* (2006.01)
*F16B 1/00* (2006.01)

(52) U.S. Cl.
CPC .............. *A47B 87/002* (2013.01); *A47B 9/20* (2013.01); *F16B 1/00* (2013.01); *F16B 2001/0035* (2013.01)

(58) Field of Classification Search
CPC ..... A47B 87/002; A47B 87/005; A47B 87/00; A47B 9/20; A47B 21/00; A47B 2200/0066
USPC ........ 108/64, 50.01, 180, 186, 190; 248/188
See application file for complete search history.

(56) References Cited

U.S. PATENT DOCUMENTS

| | | |
|---|---|---|
| 3,188,138 A | 6/1965 | Lockshin |
| 3,741,130 A | 6/1973 | Workman et al. |
| 4,408,543 A | 10/1983 | Griffin |
| 4,476,651 A | 10/1984 | Drury |
| 4,665,836 A | 5/1987 | Burr |
| 4,679,510 A | 7/1987 | Veyhl et al. |
| 4,748,913 A | 6/1988 | Favaretto et al. |
| 5,522,324 A | 6/1996 | van Gelder et al. |

(Continued)

OTHER PUBLICATIONS

Known Table Benching Products Photographs.

*Primary Examiner* — Jose V Chen
(74) *Attorney, Agent, or Firm* — Cook Alex Ltd.

(57) ABSTRACT

This disclosure provides apparatus that includes kits and systems for connecting together a plurality of tables, having a plurality of elongated foot members that include a plurality of table leg connectors that are connectable to the lower ends of legs of a plurality of tables.

20 Claims, 11 Drawing Sheets

(56) References Cited

U.S. PATENT DOCUMENTS

| | | |
|---|---|---|
| 5,704,299 A | 1/1998 | Corpuz, Jr. et al. |
| 5,752,449 A | 5/1998 | Simon et al. |
| 5,791,259 A | 8/1998 | Mansfield et al. |
| 5,794,545 A | 8/1998 | McDaniel et al. |
| 5,927,214 A | 7/1999 | Schwartz et al. |
| 5,988,077 A | 11/1999 | Balderi |
| 6,041,722 A | 3/2000 | Baker |
| 6,336,414 B1 | 1/2002 | Stewart et al. |
| 6,497,184 B1 | 12/2002 | Whitesitt |
| 6,598,542 B2 | 7/2003 | Goldberg et al. |
| 7,934,459 B2 | 5/2011 | Frazier |
| 8,061,278 B2 | 11/2011 | Skiba |
| 8,122,837 B2 | 2/2012 | Shields |
| 8,534,752 B2 | 9/2013 | Martin et al. |
| 8,667,908 B2 | 3/2014 | Martin et al. |
| 8,689,705 B2 | 4/2014 | Martin et al. |
| 9,655,445 B2 * | 5/2017 | Gammon .............. A47B 87/002 |
| 2002/0166482 A1 | 11/2002 | Goldberg et al. |
| 2003/0010260 A1 | 1/2003 | Chang |
| 2008/0295745 A1 | 12/2008 | Hamilton et al. |
| 2015/0083028 A1 | 3/2015 | Bedard et al. |

* cited by examiner

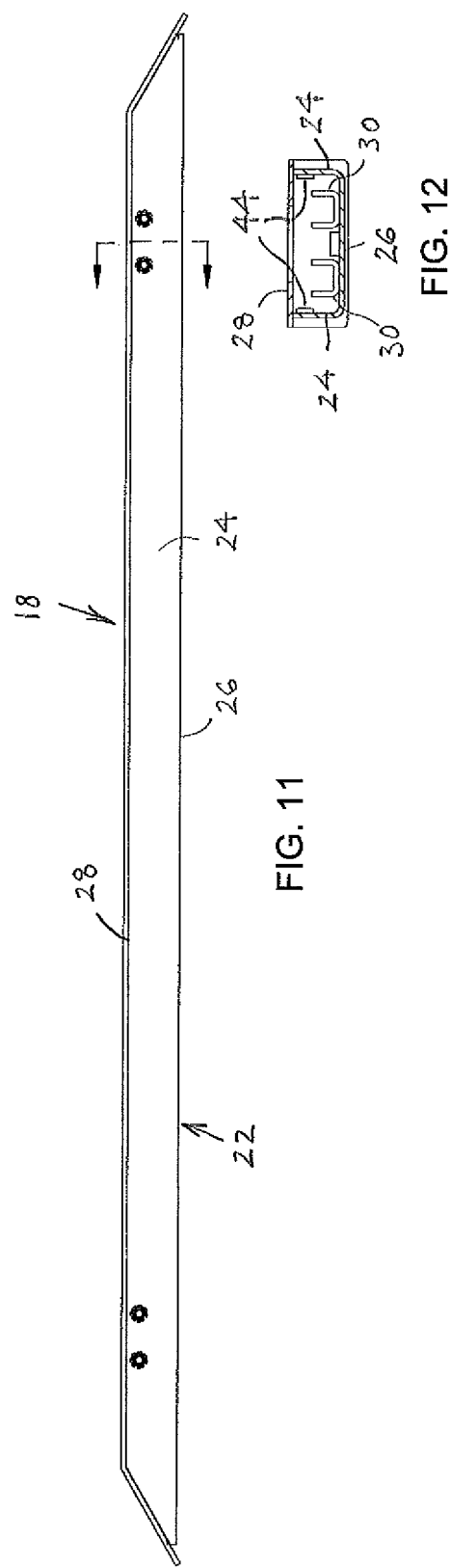
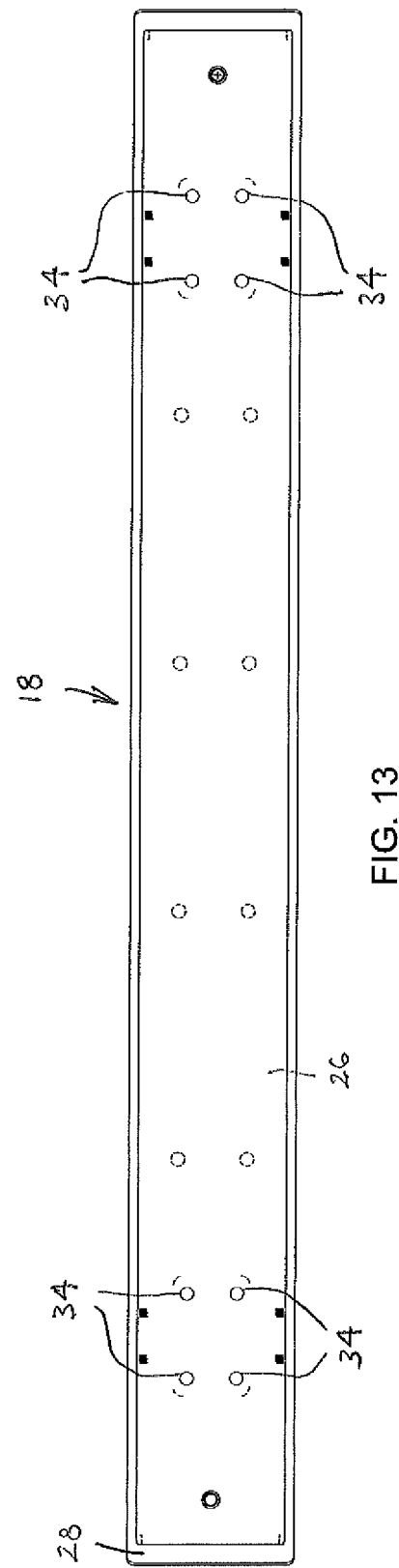
FIG. 11
FIG. 12
FIG. 13

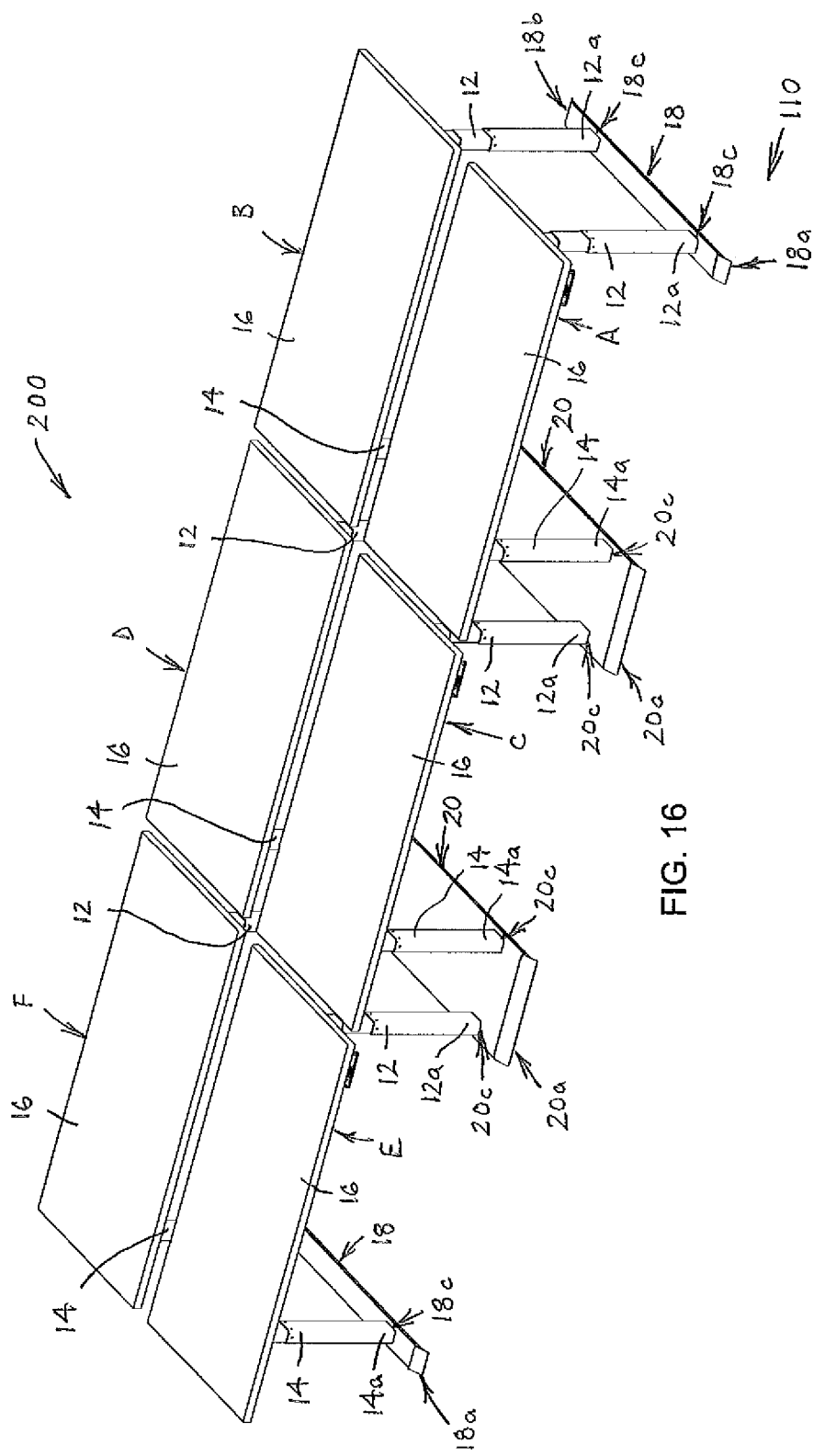

TABLE BENCHING APPARATUS AND METHODS OF USING THE SAME

CROSS-REFERENCE TO RELATED APPLICATION

This application is a continuation of and claims the benefit of U.S. patent application Ser. No. 14/870,371, filed Sep. 30, 2015, the disclosure of which is hereby incorporated by reference in its entirety.

FIELD OF THE DISCLOSURE

This disclosure generally relates to apparatus and methods for connecting a plurality of tables into a table benching system. More particularly, it relates to apparatus that includes kits and systems for connecting together a plurality of tables, having a plurality of elongated foot members that include a plurality of table leg connectors that are connectable to the lower ends of legs of the plurality of tables.

BACKGROUND

Modern office spaces often are required to accommodate various working arrangements. Office furniture may be arranged in numerous ways to accommodate users that require different types of collaborative working environments, sometimes in larger, more open spaces. In some instances, two or more tables, whether of fixed or adjustable height, may be pushed together or otherwise connected together to form what have become known as "table benching systems" or ganged table systems. Attempting to simply place tables in a closely spaced apart arrangement often is not acceptable because of the difficulty in keeping the respective tables aligned in a pleasing and orderly arrangement. Indeed, if tables are not positively located relative to each other, and in appropriately spaced positions, there is an increased risk of disruptive and distracting movement of individual tables and of undesirable pinching of users. Unfortunately, prior art apparatus for connecting tables into table benching systems tends to be bulky and obstructive of the spaces between and/or around the respective tables, which can limit sight lines and pathways for cabling or use of other structures between the tables.

SUMMARY

Disclosed are example apparatus and methods for connecting a plurality of tables into a table benching system. The illustrated example apparatus includes kits for connecting a plurality of tables, and resulting systems that include a kit and the tables that are connected or ganged together to provide multiple coordinated user work stations.

The apparatus permits users to switch between having independent tables and a table benching system, based on its modular construction that also is capable of adding sequential pairs of tables to previously connected tables. Thus, an entire table benching system that includes a plurality of tables and elongated foot members may be purchased and used as original equipment, or a table benching kit having elongated foot members may be used to connect and configure a plurality of existing otherwise stand-alone tables into a table benching system. The ability to remove the original feet on a plurality of tables and to instead utilize a kit having such modular application allows for much desired flexibility for end users who may later need to adapt the use and placement of the plurality of tables to changing spaces or collaborative furnishing needs.

In another aspect, a table benching kit is provided for connecting together a plurality of tables that each have at least two legs and a table top. The table benching kit includes at least first and second elongated foot members, with each of the at least first and second elongated foot members having opposed ends and further including a plurality of table leg connectors spaced apart from each other and spaced inward from the respective opposed ends. At least a first one of the plurality of table leg connectors of the first elongated foot member is connectable to a lower end of a first leg of a first table and at least a second one of the plurality of table leg connectors of the first elongated foot member is connectable to a lower end of a first leg of a second table, while at least a first one of the plurality of table leg connectors of the second elongated foot member is connectable to a lower end of a second leg of the first table and at least a second one of the plurality of table leg connectors of the second elongated foot member is connectable to a lower end of a second leg of the second table, such that when the table benching kit is connected to the lower end of the legs of the first and second tables, the first and second tables are positioned parallel to each other.

In another aspect, a table benching system is provided including first and second tables, with each of the first and second tables further having at least a first leg and a second leg that are connected to a table top, and first and second elongated foot members, with each of the first and second elongated foot members having opposed ends and further including a plurality of table leg connectors spaced apart from each other and spaced inward from the respective opposed ends. A lower end of the first leg of the first table and a lower end of the first leg of the second table are connected to respective table leg connectors of the first elongated foot member, and a lower end of the second leg of the first table and a lower end of the second leg of the second table are connected to respective table leg connectors of the second elongated foot member, and when the respective lower ends of the legs of the first and second tables are connected to the first and second elongated foot members, the table tops of the first and second tables are positioned parallel to each other.

The present disclosure addresses shortcomings in prior art arrangements for table benching, while providing for enhanced aesthetic designs and convenience. Each elongated foot member may be constructed to receive at least one leg of two or more tables. A variety of materials, styles and methods of construction of elongated foot members may be used, which may include alternative structures for the table leg connectors. The elongated foot members may be constructed with different materials, which generally are rigid, and may include various metals, plastics, wood or the like. The ability to utilize a variety of materials in designing and constructing the elongated foot members is highly advantageous and permits diverse and creative alternative designs. Depending on the selection of materials, this also may yield elongated foot members of less bulky construction, potentially reducing the weight and/or volume necessary for shipping.

In an office benching system, it is not desirable to transfer motion form one connected work surface of a table to another work surface of a further table. To avoid a tendency for elongated foot members to flex and transmit motions from one table to another, each elongated foot member that connects legs of two or more tables may include one or more stiffeners. To avoid damage to a floor or ground surface and to the elongated foot members, the elongated foot members may include glides that extend downward from the elongated foot members to engage and rest on the ground surface. To permit leveling adjustment of the table tops, the optional glides also may be height adjustable. Stiffeners also may help to support the load of the connected tables that may be transmitted to the floor via two or more glides.

It should be noted that four tables can be connected by using matching elongated foot members and connecting two of the elongated foot members with spanners to bridge between them and keep them parallel. For ease of assembly and improved aesthetics, each spanner may conveniently include a removable cover. Alternatively, a table benching system may use two different types of elongated foot members, including a first type located at the ends of the system and that are connected to legs of two tables. and a second type located at intermediate locations that are connected to legs of four tables.

It is to be understood that both the foregoing general description and the following detailed description are exemplary and provided for purposes of explanation only, and are not restrictive of the disclosure, as claimed. Further features and objects of the present disclosure will become more fully apparent in the following description of an example embodiment and from the appended claims.

BRIEF DESCRIPTION OF THE DRAWINGS

In describing the example apparatus and methods disclosed herein, reference is made to the accompanying drawings wherein like parts have like reference numerals, and wherein:

FIG. 11 is a side view of the elongated foot member shown in FIGS. 7 and 8, with a lateral section line through the elongated foot member;

FIG. 12 is a lateral cross-section view of the elongated foot member shown in FIG. 11;

FIG. 13 is a bottom plan view the elongated foot member shown in FIGS. 7 and 8;

FIG. 16 is an upper perspective view of a further extension of the example table benching kit and table benching system shown in FIG. 15.

Figure 1:
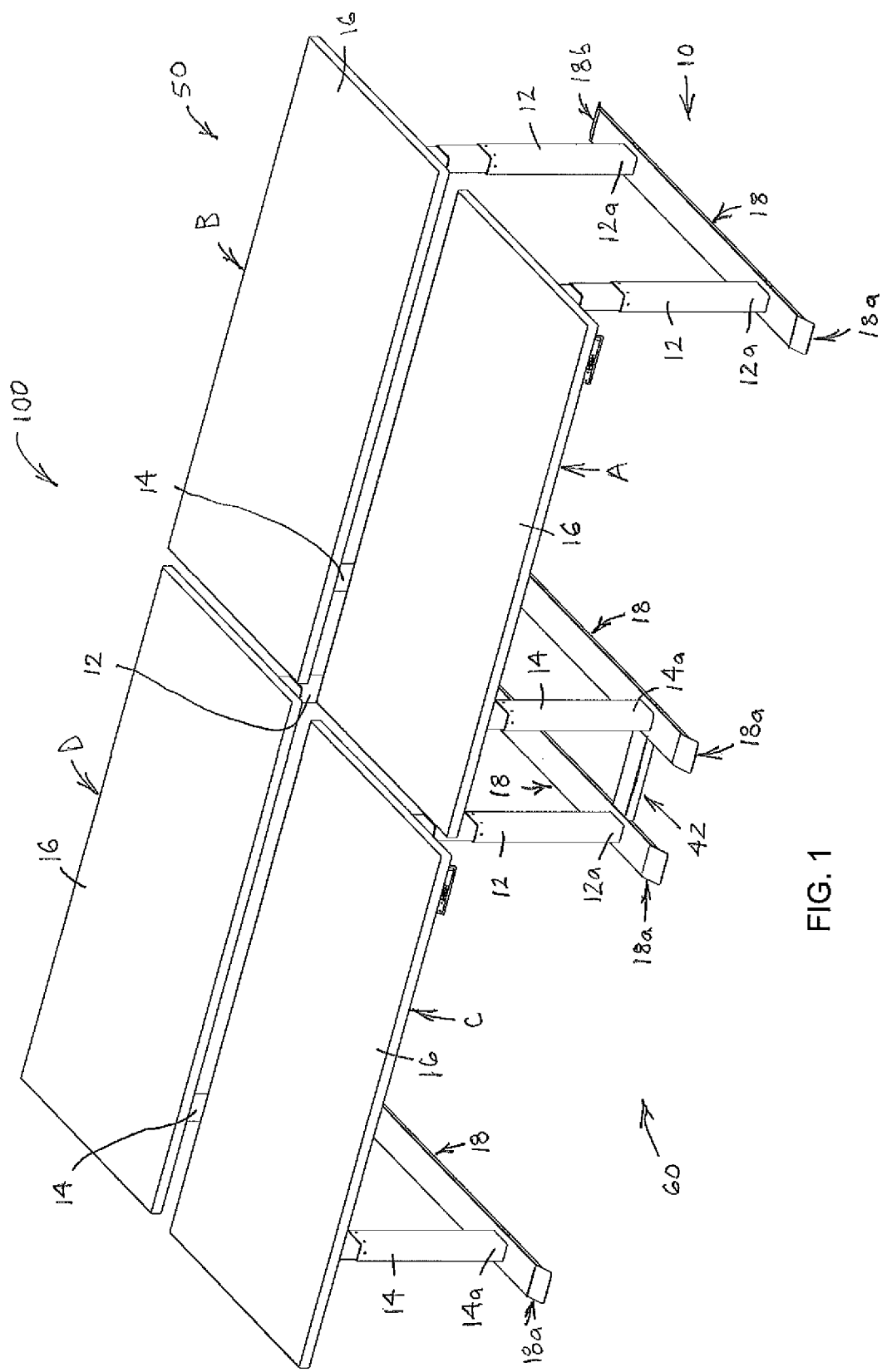
FIG. 1 is an upper perspective view that shows a first example of a table benching kit arranged with two tables in an example table benching system, as well as a further example that includes an extension of the first example table benching system based on the inclusion of a second pair of tables and further table benching kit components that permit the connection of four tables.

It should be understood that the drawings are not to scale and that actual embodiments may differ. It also should be understood that the claims are not limited to the particular examples illustrated, but rather cover various configurations of table benching kits that may be used within alternative table benching systems.

DETAILED DESCRIPTION

Although the following discloses examples of table benching kits and table benching systems, and methods of using the same, persons of ordinary skill in the art will appreciate that the teachings of this disclosure are in no way limited to the example embodiments. On the contrary, it is contemplated that the teachings of this disclosure may be implemented in alternative configurations and environments. In addition, although the examples described herein are shown in conjunction with particular configurations of tables and elongated foot members, those having ordinary skill in the art will readily recognize that the teachings of the disclosure herein may be used in alternative kits and systems, whether the tables have two or more legs and whether the elongated foot members receive legs of two or four tables, and may be designed to be used with alternative table and/or elongated foot member constructions.

Referring to FIGS. 1-13, it will be appreciated that a first example table benching kit 10 is provided for connecting together a plurality of tables, with the first example including a pair of tables. While they need not necessarily be identical, the two tables of the first example have the same construction. Each of the two tables has at least two legs 12, 14 that are connected to a table top 16. It will be appreciated that the legs generally are located proximate opposed ends of the each table, either at or spaced inward from the respective ends of the table top 16. It also will be appreciated that each table could have more than two table legs, such as having four or more legs. While the two tables are of similar construction, for convenience of description, the first two tables will be referred to as tables A and B. The first example table benching kit 10, in combination with the plurality of tables A and B, form a first example table benching system 50 that includes the two tables A, B being connected together and having their table tops 16 parallel and spaced apart from each other, in a side by side orientation.

In this example, the table benching kit 10 includes at least first and second elongated foot members. In this example, while they need not be, the elongated foot members advantageously have the same construction. Thus, the elongated foot members are of even-handed or universal configuration, in that each elongated foot member may be installed at either end and may be turned in either direction. Each of the first and second elongated foot members 18 has opposed ends 18a, 18b, and further includes a plurality of table leg connectors 18c. Each of the elongated foot members 18 has its table leg connectors 18c spaced apart from each other and spaced inward from the respective opposed ends 18a, 18b.

Figure 2:
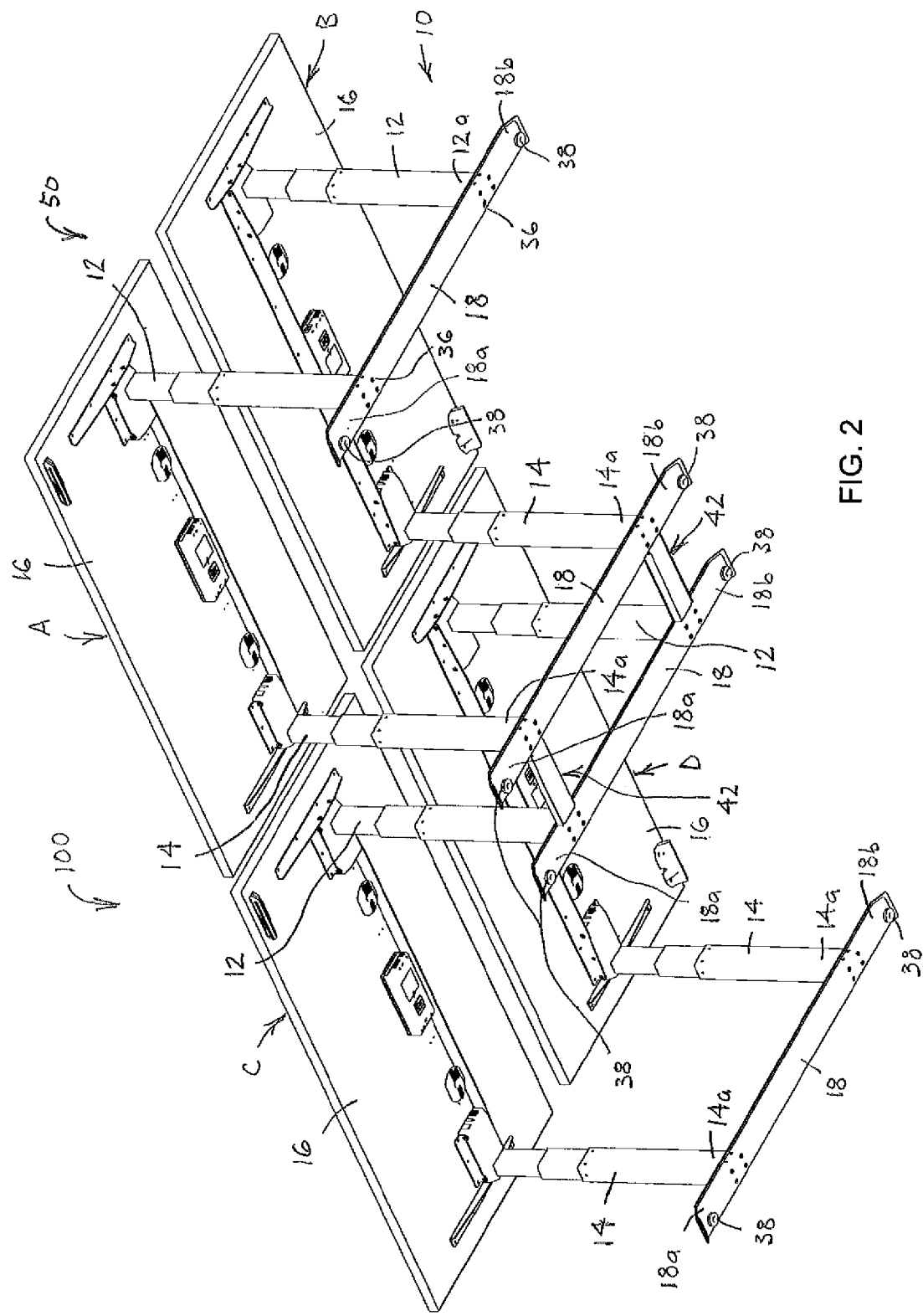
FIG. 2 is a lower perspective view of the example kits and systems shown in FIG. 1.
Figure 3:
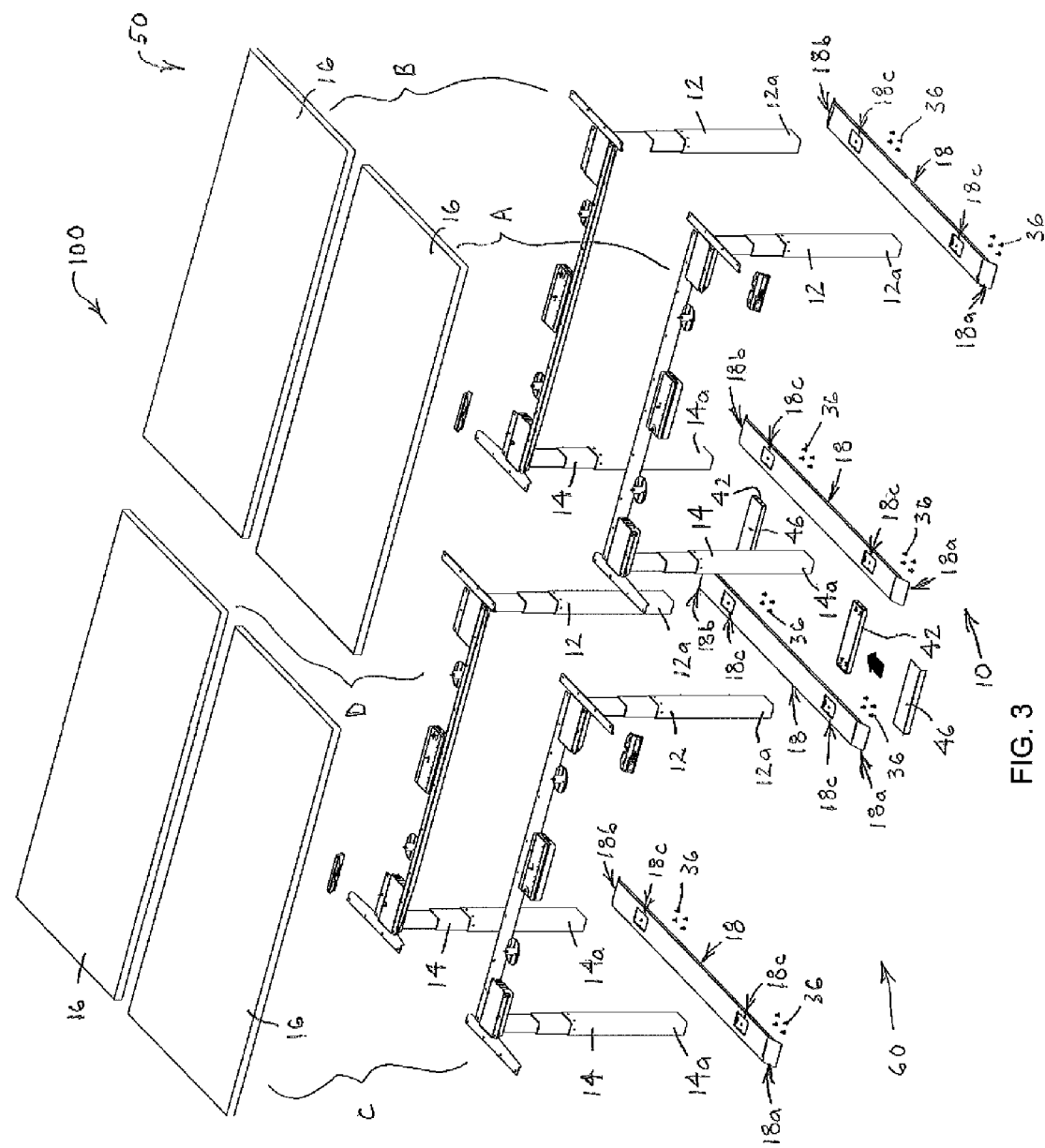
FIG. 3 is an upper perspective exploded view of the example kits and systems shown in FIGS. 1 and 2.
Figure 4:
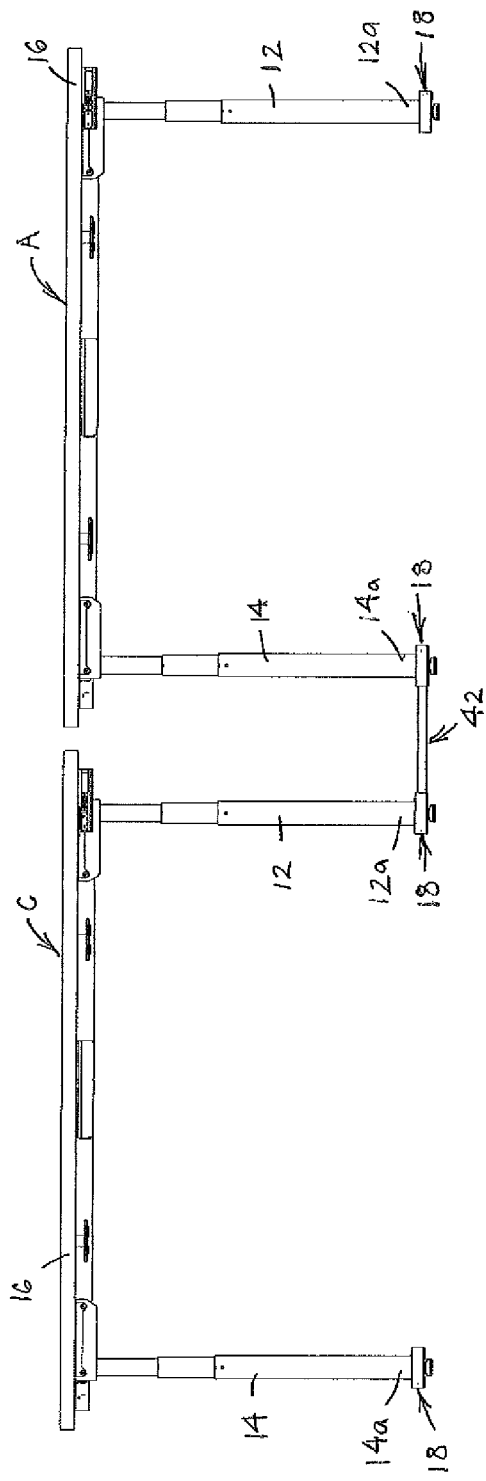
FIG. 4 is a side plan view of the example kits and systems shown in FIGS. 1-3.
Figure 5:
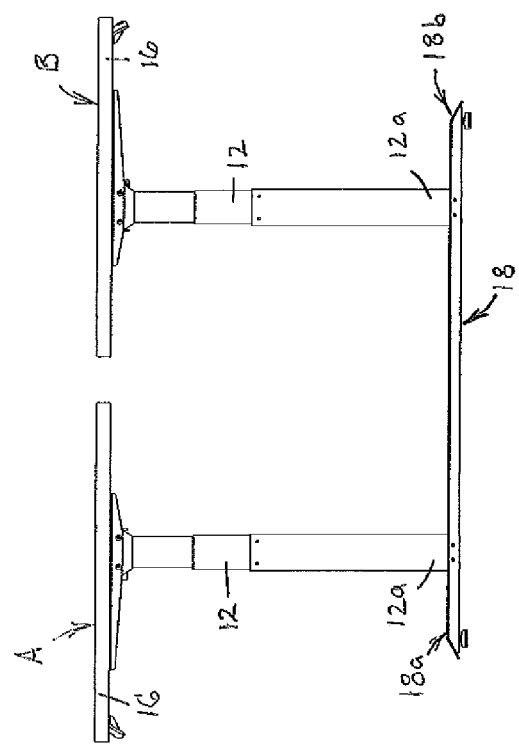
FIG. 5 is an end plan view of the example kits and systems shown in FIGS. 1-3.
Figure 6:
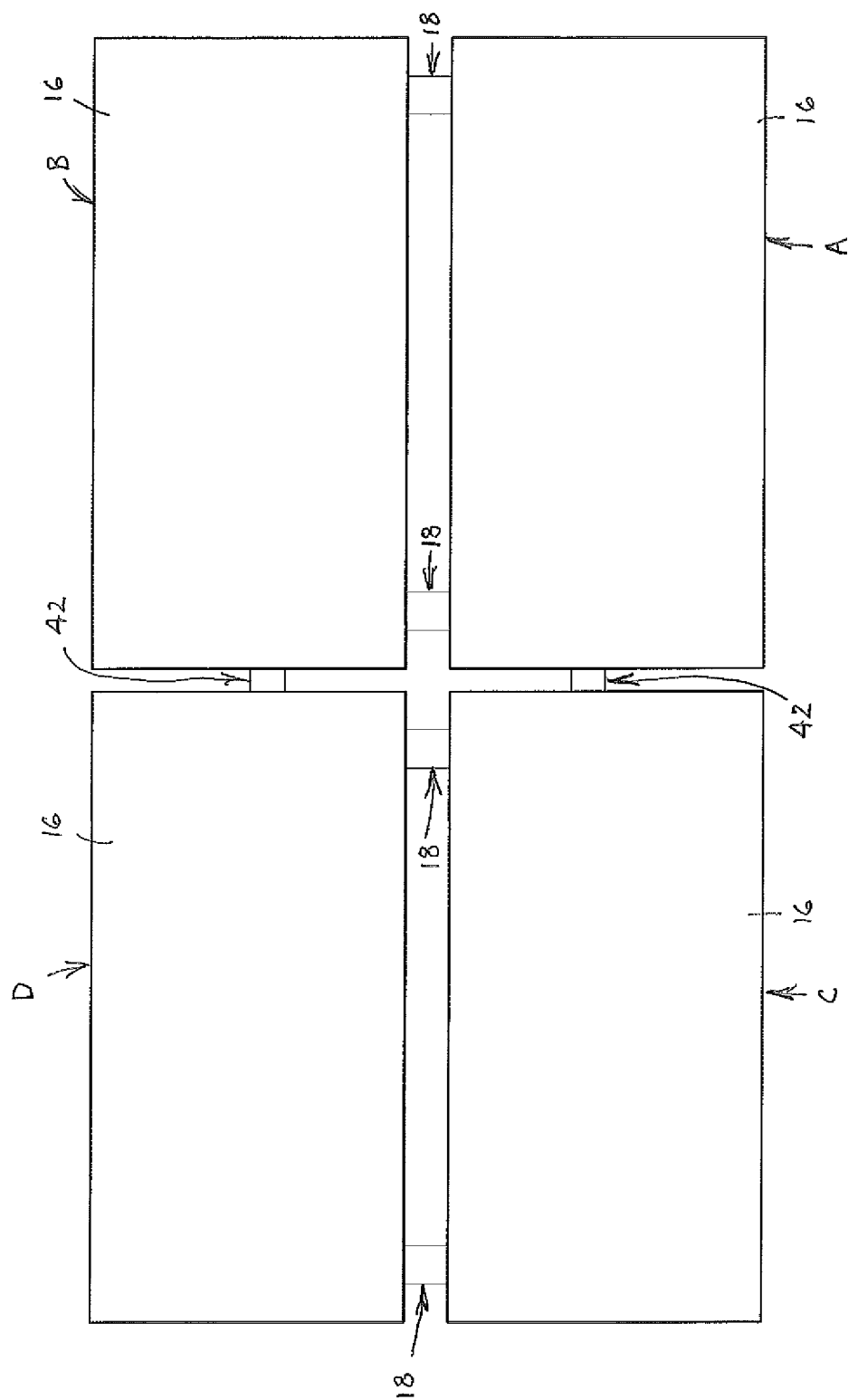
FIG. 6 is a top plan view of the example kits and systems shown in FIGS. 1-3.
Figure 7:
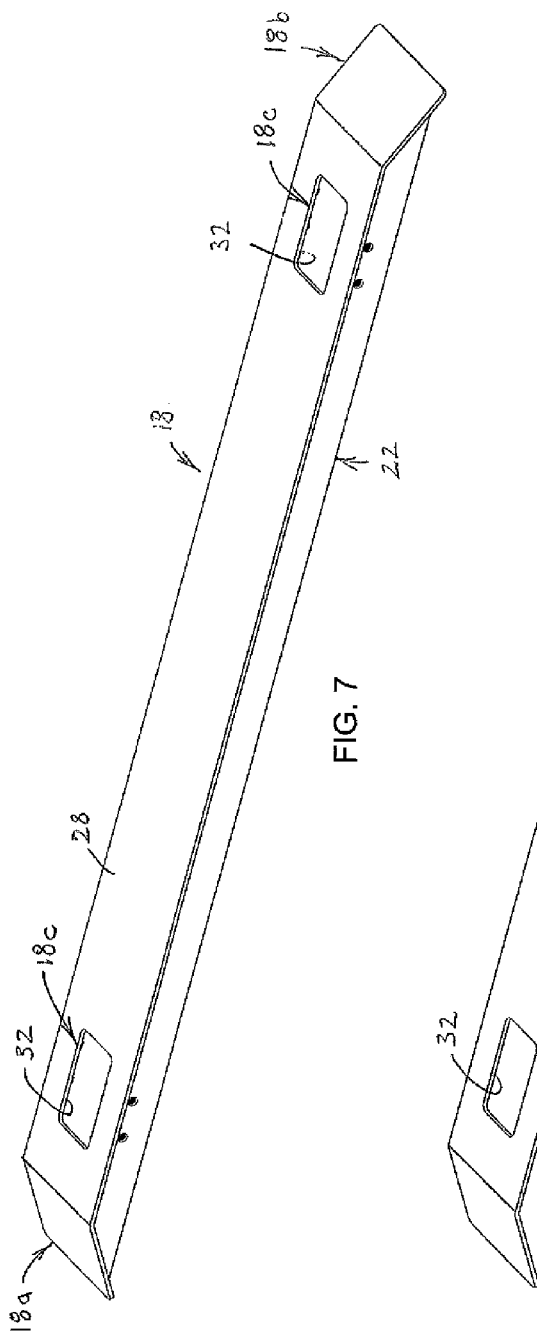
FIG. 7 is an upper perspective view of an elongated foot member used to connect the lower ends of respective legs of two tables in the example kits and systems shown in FIGS. 1-3.
Figure 8:
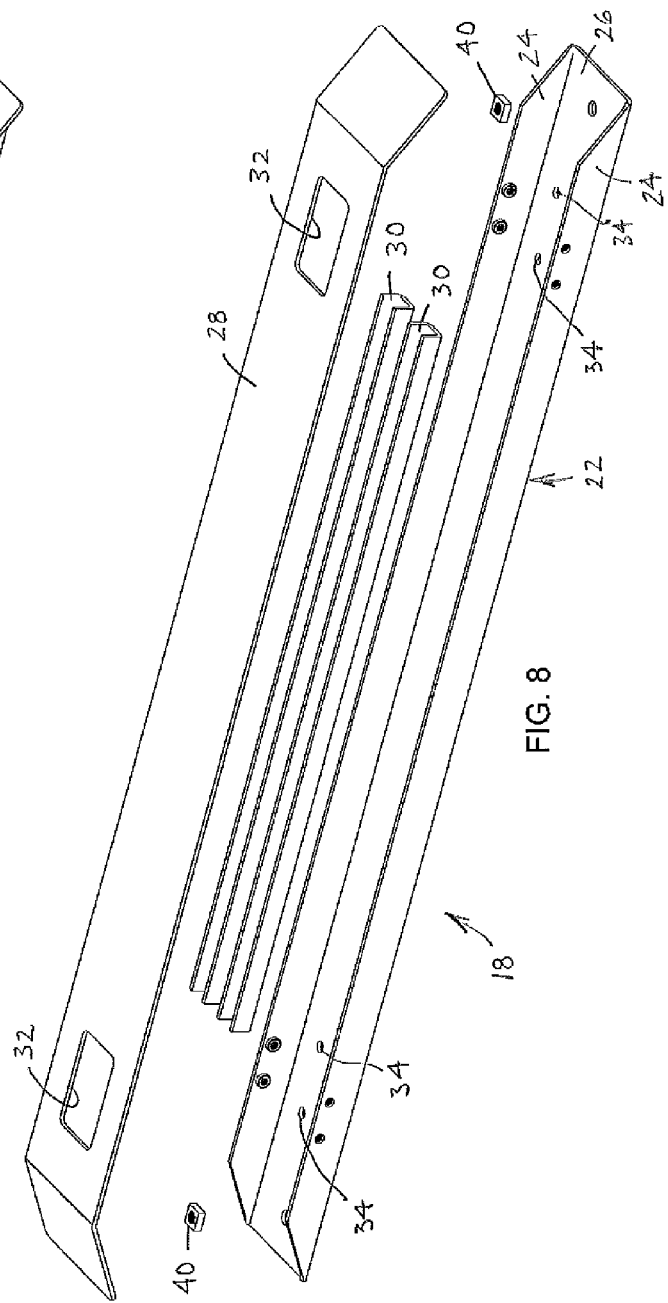
FIG. 8 is an upper perspective exploded view of the elongated foot member shown in FIG. 7.
Figure 9:
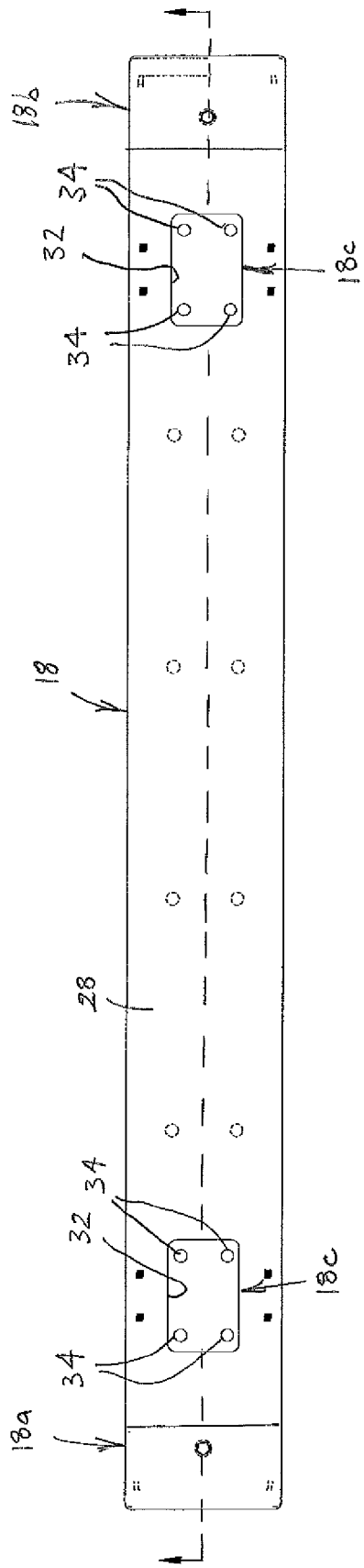
FIG. 9 is a top plan view of an elongated foot member shown in FIGS. 7 and 8, with a longitudinal section line through the elongated foot member.
Figure 10:
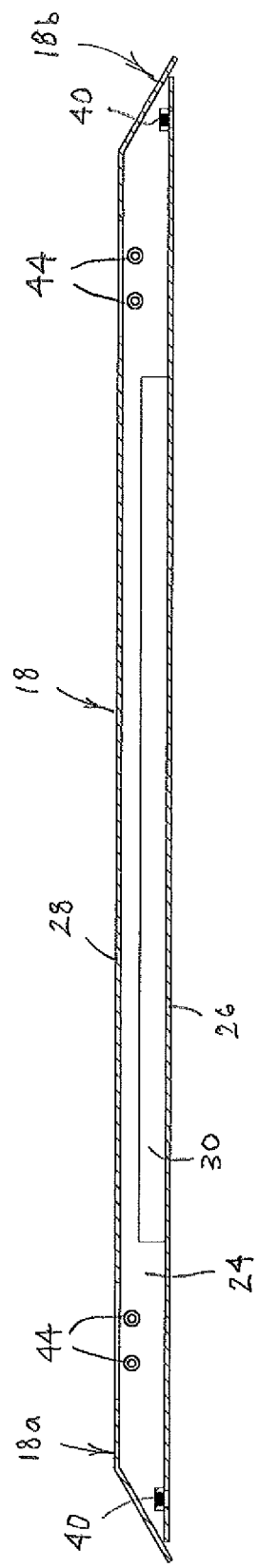
FIG. 10 is a longitudinal cross-section view of the elongated foot member shown in FIG. 9.

As may be seen in FIGS. 1-3, at least a first one of the plurality of table leg connectors 18c of the first elongated foot member 18 is connectable to a lower end 12a of a first leg 12 of a first table A and at least a second one of the plurality of table leg connectors 18c of the first elongated foot member 18 is connectable to a lower end 12a of a first leg 12 of a second table B. At least a first one of the plurality of table leg connectors 18c of the second elongated foot member 18 is connectable to a lower end 14a of a second leg 14 of the first table A and at least a second one of the plurality of table leg connectors 18c of the second elongated foot member 18 is connectable to a lower end 14a of a second leg 14 of the second table B. It will be appreciated that when the table benching kit 10 is connected to the lower ends 12a, 14a of the legs 12, 14 of the first and second tables A, B, the first and second tables A, B and their respective table tops 16 are positioned parallel to each other, and the table benching kit 10 and tables A, B form the table benching system 50.

While there could be selective differences, for cost effectiveness, ease of manufacture and assembly, all of the elongated foot members 18 of the example table benching kit 10 and table benching system 50 have the same construction. Thus, the elongated foot members 18 could be used on either end of a like pair of tables A, B, and may be reversed in direction. More detailed views of an example elongated foot member 18 are shown in FIGS. 7-13. As may be seen with respect to the example elongated foot member 18, each of the first and second elongated foot members further comprises a lower portion 22 that supports at least one leg 12 or 14 of each of the first and second tables A, B. As further may be seen with respect to the example elongated foot member 18, the lower portion 22 of each of the first and second elongated foot members 18 may include two upstanding side walls 24 connected to a lower wall 26. Still further, the elongated foot member 18 may include an upper wall 28 connected to the lower portion 22, such as by connection to the two upstanding side walls 24 by welding or other suitable means of connection.

Additional stiffening of each of the elongated foot members 18 may help to isolate motion of one table from another, and may increase the rigidity and load capacity of the respective elongated foot members. This is shown with respect to an example elongated foot member 18, which may further include at least one stiffening element 30. As may be seen in FIGS. 8, 10 and 12, the example stiffening element 30 may be constructed as a generally elongated U-shaped channel. The stiffening element 30 also may be connected to and extend along at least a portion of the lower wall 26 of the lower portion 22. Indeed, the example elongated foot members 18 of the table benching kit 10 and table benching system 50 may include one or more stiffening elements 30, and the example elongated foot member 18 is shown having a pair of stiffening elements 30 disposed between the two upstanding side walls 24 and being connected to the lower wall 26, such as by welding, use of fasteners or other suitable means of connection.

As shown with the example elongated foot member 18, each table leg connector 18c may include an aperture 32 in the example upper wall 28 of each of the first and second elongated foot members 18, 20. Each aperture 32 is configured to receive a lower end 12a, 14a of at least one leg 12, 14 of the first or second table A, B. As further shown in the example, the table leg connectors 18c also may include the lower wall 26 of each of the first and second elongated foot members 18 further including at least one aperture 34, and at least one fastener 36 that is extendable through the at least one aperture 34 and connects the lower portion 22 to the lower end 12a, 14a of at least one leg 12, 14 of the first or second table A, B. In this example, four fasteners 36, in the form of threaded screws, extend through four apertures 34 and are used to removably and rigidly connect a table leg 12, 14 to the elongated foot member 18 by being received in corresponding threaded apertures in the lower end 12a, 14a of the respective table leg 12, 14. With the disclosed structure, connection of the table legs to the elongated foot members is easily established and provides sufficient support and rigidity to hold upright the tables A, B, each of which has only two legs. While the table leg connectors of the present example include an aperture in an upper wall of an elongated foot member that receives a lower end of a table leg, as well as at least one fastener that connects the lower end of the table leg to a lower wall of the elongated foot member, it will be appreciated that the table leg connectors may be of alternative construction. For instance, a table leg connector may provide an upright extension from an elongated foot member, with the upright extension being received within a lower end of a table leg, such as in a sleeved configuration. Thus, there may be alternative structures used for the table leg connectors, and they may depend on the structures of the lower ends of the table legs that are intended to be connected to the elongated foot members.

As further illustrated, each of the first and second elongated foot members 18 optionally may have at least two downward extending glides 38, intended to contact and rest on a ground or floor surface while holding the lower portion 22 of the elongated foot member 18 above the ground surface. In this example, each glide 38 extends downward from and may be adjustable relative to the lower wall 26, such as by having the glide 38 include a threaded shaft that is received by a female threaded insert 40 that is connected to the lower wall 26, such as by welding, press fit or other suitable means of connection. It will be appreciated that the glides may be useful ultimately in leveling the surfaces of the table tops 16 of the tables A, B. Also, while two adjustable glides 38 are shown on each elongated foot member 18, more than two glides may be provided and they may be height adjustable or of a simple fixed length.

The aforementioned provides a table benching system 50 that includes first and second tables A and B, with each of the first and second tables A, B further having at least a first leg 12 and a second leg 14 that are connected to a table top 16, and first and second elongated foot members 18. Each of the first and second elongated foot members 18 has opposed ends 18a, 18b and further includes a plurality of table leg connectors 18c spaced apart from each other and spaced inward from the respective opposed ends 18a, 18b. A lower end 12a of the first leg 12 of the first table A and a lower end 12a of the first leg 12 of the second table B are connected to respective table leg connectors 18c of the first elongated foot member 18. A lower end 14a of the second leg 14 of the first table A and a lower end 14a of the second leg 14 of the second table B are connected to respective table leg connectors 18c of the second elongated foot member 18. When the respective lower ends 12a, 14a of the legs 12, 14 of the first and second tables A, B are connected to the first and second elongated foot members 18, the table tops 16 of the first and second tables A, B are positioned parallel to each other.

While a table benching kit 10 may include only two elongated foot members, 18 that connect two tables A, B into a table benching system 50, it will be appreciated that table benching kits and systems provided herein are extendible by adding one or more successive further pairs of tables. For instance, FIGS. 1-3 also can be understood to show an example table benching kit 60 that may be connected to a plurality of tables that includes a further pair of tables C and D. The tables C, D are of the same construction as tables A, B, and together with the table benching kit 60, the tables form a table benching system 100. Thus, this further example table benching kit 60 includes at least third and fourth elongated foot members 18, with each of the at least third and fourth elongated foot members 18 the same construction as the first and second elongated foot members, with opposed ends 18a, 18b and further including a plurality of table leg connectors 18c, spaced apart from each other and spaced inward from the respective opposed ends.

As may be seen in the example shown in FIGS. 1-3, at least a first one of the plurality of table leg connectors 18c of the third elongated foot member 18 is connectable to a lower end 12a of a first leg 12 of the third table C and at least a second one of the plurality of table leg connectors 18c of the third elongated foot member 18 is connectable to a lower end 12a of a first leg 12 of the fourth table D. Further, at least a first one of a plurality of table leg connectors 18c of the fourth elongated foot member 18 is connectable to a lower end 14a of a second leg 14 of the third table C and at least a second one of the plurality of table leg connectors 18c of the fourth elongated foot member 18 is connectable to a lower end 14a of a second leg 14 of the fourth table D. Thus, the third and fourth tables C, D are connected by further pair of elongated foot members 18.

In this example of a further extended table benching system, at least one spanner 42 connects the second elongated foot member 18 to the third elongated foot member 18. As such, when the at least one spanner 42 is connected to the second and third elongated foot members, and the table benching kit 60 is connected to the lower end of the legs of the first, second, third and fourth tables A-D, respectively, the first, second, third and fourth tables A-D are positioned parallel to each other. Connection of the table benching kit 60 to the four tables A-D provides a sleek and clutter free table benching system 100 that is capable of maintaining an orderly, parallel and spaced apart arrangement of the tables A-D.

The example table benching kit 60 is shown with a second spanner 42 that connects the second elongated foot member 18 to the third elongated foot member 18. In this example, female threaded inserts 44 are connected to each of the upstanding side walls 24 at apertures therein by press fit, welding or other suitable means of connection. This permits use of fasteners, such as threaded screws to secure the ends of the spanners 42 to the lower portion 22 of the elongated foot members by engagement with the inserts 44. To conceal the use of such fasteners, a cover 46 may be used with each spanner 42. In this example, the cover 46 may include a releasable connector, such as a magnet, if at least one of the cover 46 and/or spanner 42 is of steel construction. However, it will be appreciated that other forms of releasable connectors may be used, such as hook and loop fasteners, push pins, twist lock fasteners, or the like. The cover 46 may be slid into place above the spanner 42 and below an edge of the upper wall 28, yielding a particularly clean fit and finish for the table benching system 100, or may be snap fit over or otherwise connected to the spanner.

It will be appreciated that one wide spanner or two or more narrower spanners may be used to maintain a parallel connection between the second and third elongated foot members, and the spanners may be of alternative construction but should be of the same length. It also will be understood that the distance between the ends of the table tops 16 and respective the legs 12, 14 will influence the length and/or configuration of the at least one spanner that is needed to connect two elongated foot members, with the possibility that elongated foot members may be immediately adjacent each other and the spanner may be simply in the form of a fastener or fasteners that hold the elongated foot members adjacent each other. Moreover, the design of the relative locations of the table legs and table tops, as well as the elongated foot members and their respective table leg connectors, may be chosen to permit a given table construction to yield a table benching system with positioning of the table tops adjacent each other or further spaced apart from each other.

Figure 14:
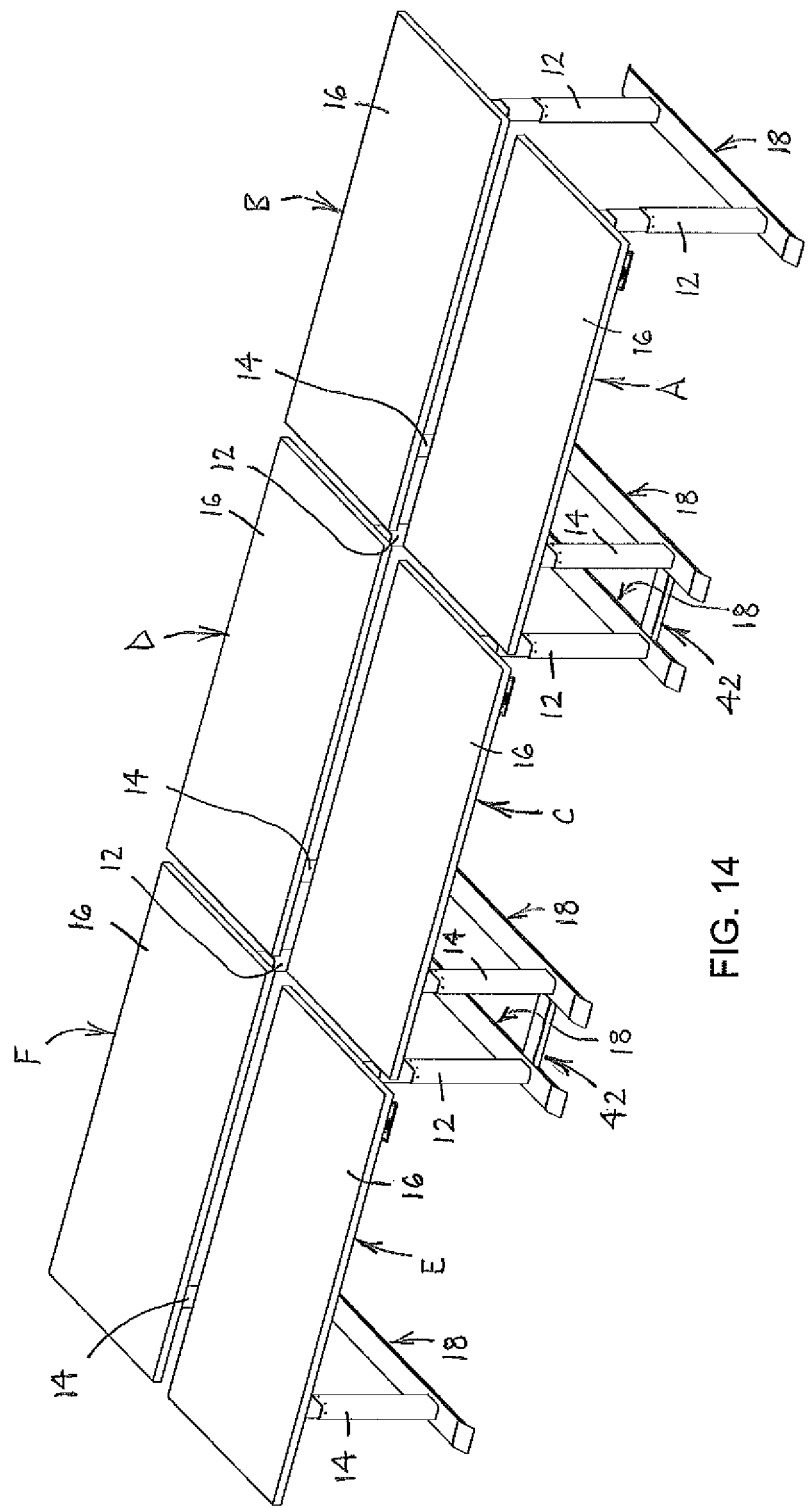
FIG. 14 is an upper perspective view of six tables in a further extension of the example table benching kits and table benching systems shown in FIGS. 1-3.

With use of the table benching kit 60, a series of connected pairs of tables is defined when the each of the first and second elongated foot members 18 is connected to a first pair of tables A, B and when each of the third and fourth elongated foot members 18 is connected to a second pair of tables C, D, and the second pair of tables C, D is further connected to the first pair of tables A, B by the at least one spanner 42. This is shown for example in FIGS. 1-3. However, this also is shown, in part, in FIG. 14 where the table benching kit 60 that connects the tables A-D may further include two or more additional elongated foot members 18 having a plurality of table leg connectors 18c, and one or more additional spanners 42 to connect one or more additional pairs of tables, such as tables E, F, to each other and to the series. It will be understood that this pattern could be repeated for any number of additional pairs of tables.

Figure 15:
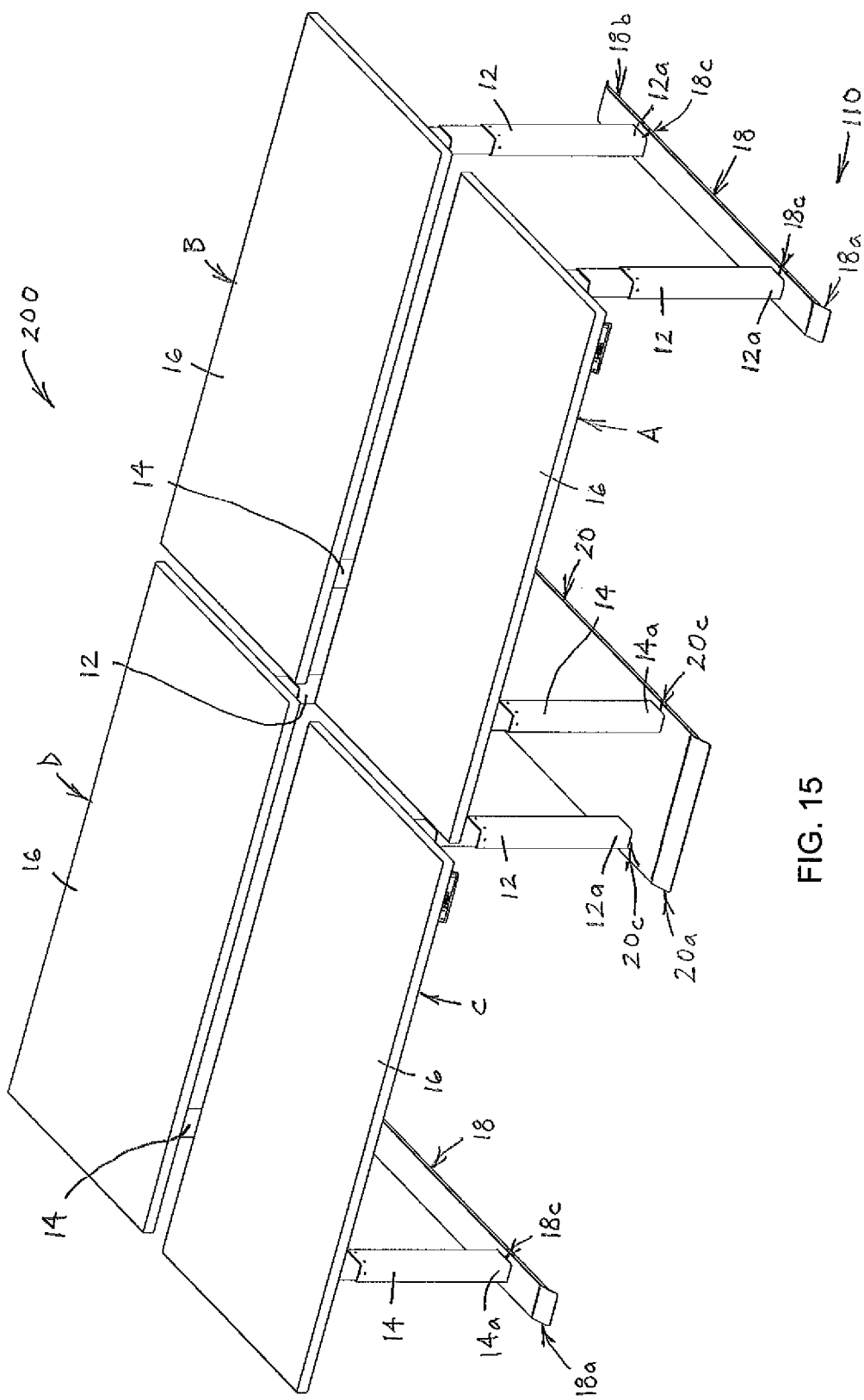
FIG. 15 is an upper perspective view of a plurality of tables connected together by another example table benching kit to form another example table benching system.

An alternative example table benching kit 110 is shown in FIG. 15, which together with four tables A-D forms a table benching system 200. In this example, two different constructions for elongated foot members are used. A first type of elongated foot member 18 has a plurality of table leg connectors 18c and is similar to the elongated foot members 18 of the prior examples. This first type of elongated foot member 18 is used exclusively at the outer ends of the table benching system 200, to receive and connect together the lower ends of at least one leg from each of two tables, such as tables A and B, or tables C and D. A second type of elongated foot member 20 has opposed ends 20a, 20b, and further includes a plurality of table leg connectors 20c. Each elongated foot member 20 has its table leg connectors 20c spaced apart from each other and spaced inward from the respective opposed ends 20a, 20b, but in sufficient number to receive and connect together the lower ends of at least one leg from each of four tables, such as tables A-D. The second type of elongated foot member 20 is used at intermediate positions between the ends of the system. The elongated foot member 20 is wider than the elongated foot member 18, and it includes a plurality of table leg connectors 20c that are of sufficient number to connect to four tables simultaneously. The elongated foot member 20 may include one or more stiffening elements 30, or of an alternative configuration, to enhance the rigidity and load capacity of the wider elongated foot member 20 that may be connected to four or more table legs. With four tables A-D connected together, the first type of elongated foot member 18 is used in the first and third positions along the length of the system, while the second type of elongated foot member 20 is used in the second position along the length of the system.

FIG. 15 illustrates a table benching kit 110 for connecting together a plurality of tables A-D, however, in this arrangement, second elongated foot member 20 is of the second type having additional table leg connectors 20c. Thus, at least a first one of the plurality of table leg connectors 20c of the second elongated foot member 20 is connectable to a lower end 14a of a second leg 14 of the first table A and at least a second one of the plurality of table leg connectors 20c of the second elongated foot member 20 is connectable to a lower end 14a of a second leg 14 of the second table B, and at least a third one of the plurality of table leg connectors 20c of the second elongated foot member 20 is connectable to a lower end 12a of a first leg 12 of a third table C and at least a fourth one of the plurality of table leg connectors 20c of the second elongated foot member 20 is connectable to a lower end 12a of a first leg 12 of a fourth table D. In this example, at least a third elongated foot member 18 has opposed ends 18a, 18b and further includes a plurality of table leg connectors 18c spaced apart from each other and spaced inward from the respective opposed ends, where at least a first one of the plurality of table leg connectors 18c of the third elongated foot member 18 is connectable to a lower end 14a of a second leg 14 of the third table C and at least a second one of the plurality of table leg connectors 18c of the third elongated foot member 18 is connectable to a lower end 14a of a second leg 14 of the fourth table D. With this arrangement, when the table benching kit 110 is connected to the lower end of the legs of the first, second, third and fourth tables A-D, the first, second, third and fourth tables A-D are positioned parallel to each other. Accordingly, it will be understood that one can use an alternative to spanners between elongated foot members that are in the intermediate positions within a table benching system, by using elongated foot members having a different configuration that is capable of connecting together legs of four tables, instead of connecting together legs of only two tables.

As illustrated in FIG. 16, a series of connected pairs of tables may be defined when the first and second elongated foot members are connected to a first pair of tables A, B and the second and third elongated foot members are connected to a second pair of tables C, D. Moreover, such a table benching kit 110 may further include one or more additional elongated foot members 20 having a plurality of table leg connectors 20c to connect one or more additional pairs of tables E, F to each other and to the series. It will be understood that this pattern could be repeated for any number of additional pairs of tables.

It will be appreciated that the foregoing description sets forth apparatus that may be assembled for use in various table benching system configurations. For example, when assembling the table benching system 100 having four tables A-D, as shown in FIGS. 1-3, one may start by simply placing the table tops 16 of tables A and B on a level ground surface. The table tops 16 should be placed along side of each other, with the legs 12, 14 of the tables A, B extending upward. The lower ends 12a, 14a of the legs 12, 14 then may be connected by use of a pair of elongated foot members 18. The lower ends 12a, 14a of the respective legs 12, 14 are received within the leg connectors 18c in the elongated foot members 18. Fasteners 36 then may be extended through apertures 34 in the lower wall 26 to connect the lower portion 22 of each respective elongated foot member 18 to the lower ends 12a, 14a of the legs 12, 14. The third and fourth tables C and D may be connected to each other in the same way as just described for connecting the tables A and B. The two pair of connected tables A, B and C, D then may be inverted to place the elongated foot members 18 on the ground surface and then positioned to have their ends located close to each other. This will result in the four elongated foot members 18 being arranged parallel to each other. At least one spanner 42, and in this example two spanners 42, then may be connected to the second and third elongated foot members 18, so as to connect the two pair of tables into a table benching system 100 with the four tables A-D having their table tops 16 parallel to each other. In this example, the fasteners used to connect the spanners 42 to the elongated foot members 18 then may be concealed by installing removable covers 46.

The table benching system 200 shown in FIG. 15 may be assembled by placing the table tops 16 of tables A-D on a level ground surface. The table tops 16 of tables A, B and of tables C, D should be placed along side of each other in pairs, with the pairs then placed end to end. With the legs 12, 14 of the tables A-D extending upward. The lower ends 12a, 14a of the legs 12, 14 then may be connected by use of two elongated foot members 18 at the ends of the system 200 and one elongated foot member 20 at the center of the system 200. Thus, at a first end of the system 200, the lower ends 12a of the respective legs 12 of the first and second tables A, B are received within the leg connectors 18c in the first elongated foot member 18. In the center of the system 200, the lower ends 14a of the respective legs 14 of the first and second tables A, B and lower ends 12a of the respective legs 12 of the third and fourth tables C, D are received within the leg connectors 20c in the elongated foot member 20. At the second end of the system 200, the lower ends 14a of the respective legs 14 of the third and fourth tables C, D are received within the leg connectors 18c in the second elongated foot member 18.

Fasteners 36 then may be extended through apertures 34 in the lower wall 26 to connect the lower portion 22 of each respective elongated foot member 18, 20 to the lower ends 12a, 14a of the legs 12, 14. The connected assembly of the four tables A-D then may turned upright to place the elongated foot members 18, 20, 18 on the ground surface for use. It will be appreciated that the table benching kit and tables may be assembled into a table benching system in an alternative manner. For example, with the table tops 16 separated from the respective legs 12, 14 of tables A-D, the two elongated foot members 18 and one elongated foot member 20 may be connected to the respective legs 12, 14, and then placed on the ground surface with the respective legs 12, 14 extending upward. The respective table tops 16 then may be mounted onto the respective table legs 12, 14 to complete the assembly of the table benching system 200. This will result in the elongated foot members 18, 20, 18 being arranged parallel to each other and the four tables A-D having their table tops 16 parallel to each other.

While the present disclosure shows and demonstrates example apparatus for table benching kits and table benching systems, and methods of using the same, the examples are merely illustrative and are not to be considered limiting. It will be apparent to those of ordinary skill in the art that apparatus in accordance with the present disclosure may be provided in various configurations, constructed of various materials and may be constructed to be installed in combination with various types of tables, without departing from the scope or spirit of the present disclosure. Any variety of suitable materials of construction, configurations, shapes and sizes for the components and methods of connecting the components within the scope of the claims may be utilized to meet the particular needs and requirements of an end user. Thus, although example embodiments and methods of assembly relating to the table benching kits and table benching systems have been described herein, the scope of coverage of this patent is not limited to the examples illustrated. On the contrary, this patent covers all methods, apparatus and articles of manufacture fairly falling within the scope of the appended claims either literally or under the doctrine of equivalents.

What is claimed is:

1. A table benching kit for connecting together a plurality of tables that each have at least two legs and a table top, the table benching kit comprising:
   at least first and second elongated foot members;
   each of the at least first and second elongated foot members having opposed ends and further comprising a plurality of table leg connectors spaced apart from each other and spaced inward from the respective opposed ends;
   wherein when the table benching kit is connected to the plurality of tables, at least a first one of the plurality of table leg connectors of the first elongated foot member is connected to a lower end of a first leg of a first table and at least a second one of the plurality of table leg connectors of the first elongated foot member is connected to a lower end of a first leg of a second table, and at least a first one of the plurality of table leg connectors of the second elongated foot member is connected to a lower end of a second leg of the first table and at least a second one of the plurality of table leg connectors of the second elongated foot member is connected to a lower end of a second leg of the second table;
   at least third and fourth elongated foot members;
   each of the at least third and fourth elongated foot members having opposed ends and further comprising a plurality of table leg connectors spaced apart from each other and spaced inward from the respective opposed ends;
   wherein when the table benching kit is connected to the plurality of tables, at least a first one of the plurality of table leg connectors of the third elongated foot member is connected to a lower end of a first leg of a third table and at least a second one of the plurality of table leg connectors of the third elongated foot member is connected to a lower end of a first leg of a fourth table, and at least a first one of a plurality of table leg connectors of the fourth elongated foot member is connected to a lower end of a second leg of the third table and at least a second one of the plurality of table leg connectors of the fourth elongated foot member is connected to a lower end of a second leg of the fourth table;
   at least one spanner that connects the second elongated foot member to the third elongated foot member; and
   wherein when the at least one spanner is connected to the second and third elongated foot members and the table benching kit is connected to the lower end of the legs of the first, second, third and fourth tables, the first, second, third and fourth tables are positioned parallel to each other.

2. The table benching kit of claim 1, wherein each of the first and second elongated foot members further comprises a lower portion that supports at least one leg of each of the first and second tables.

3. The table benching kit of claim 2, wherein each of the first and second elongated foot members further comprises at least one elongated stiffening element.

4. The table benching kit of claim 2, wherein the lower portion of each of the first and second elongated foot members further comprises two upstanding side walls connected to a lower wall.

5. The table benching kit of claim 4, wherein each of the first and second elongated foot members further comprises an upper wall connected to the lower portion.

6. The table benching kit of claim 5, wherein the upper wall of each of the first and second elongated foot members includes at least two apertures, wherein each aperture receives the lower end of at least one leg of the first or second table.

7. The table benching kit of claim 6, wherein the lower wall of each of the first and second elongated foot members further comprises at least one aperture, and at least one fastener is extendable through the at least one aperture and connects the lower portion to the lower end of at least one leg of the first or second table.

8. The table benching kit of claim 2, wherein each of the first and second elongated foot members further comprises at least two downward extending glides.

9. The table benching kit of claim 8, wherein each glide extends downward from and is adjustable relative to the lower wall.

10. The table benching kit of claim 1, further comprising a second spanner that connects the second elongated foot member to the third elongated foot member.

11. The table benching kit of claim 1, further comprising a cover that connects to the at least one spanner, and wherein the cover further comprises a releasable connector.

12. The table benching kit of claim 11, wherein the releasable connector further comprises a magnet that connects to the spanner.

13. The table benching kit of claim 1, wherein a series of connected pairs of tables is defined when the pair of first and second elongated foot members is connected to a first pair of tables and the pair of third and fourth elongated foot members is connected to a second pair of tables and the second pair of tables is connected to the first pair of tables by the at least one spanner, and wherein the table benching kit further comprises two or more additional elongated foot members having a plurality of table leg connectors and one or more additional spanners to connect one or more additional pairs of tables to each other and to the series.

14. A table benching kit for connecting together a plurality of tables that each have at least two legs and a table top, the table benching kit comprising:
   at least first and second elongated foot members;
   each of the at least first and second elongated foot members having opposed ends and further comprising a plurality of table leg connectors spaced apart from each other and spaced inward from the respective opposed ends;
   wherein when the table benching kit is connected to the plurality of tables:
      at least a first one of the plurality of table leg connectors of the first elongated foot member is connected to a lower end of a first leg of a first table and at least a second one of the plurality of table leg connectors of the first elongated foot member is connected to a lower end of a first leg of a second table;
      at least a first one of the plurality of table leg connectors of the second elongated foot member is connected to a lower end of a second leg of the first table and at least a second one of the plurality of table leg connectors of the second elongated foot member is connected to a lower end of a second leg of the second table;
      at least a third one of the plurality of table leg connectors of the second elongated foot member is connected to a lower end of a first leg of a third table and at least a fourth one of the plurality of table leg connectors of the second elongated foot member is connected to a lower end of a first leg of a fourth table;

at least a third elongated foot member having opposed ends and further comprising a plurality of table leg connectors spaced apart from each other and spaced inward from the respective opposed ends;

at least a first one of the plurality of table leg connectors of the third elongated foot member is connected to a lower end of a second leg of the third table and at least a second one of the plurality of table leg connectors of the third elongated foot member is connected to a lower end of a second leg of the fourth table; and wherein when the table benching kit is connected to the lower end of the legs of the first, second, third and fourth tables, the first, second, third and fourth tables are positioned parallel to each other.

15. The table benching kit of claim 14, wherein a series of connected pairs of tables is defined when the first and second elongated foot members are connected to a first pair of tables and the second and third elongated foot members are connected to a second pair of tables, and wherein the table benching kit further comprises one or more additional elongated foot members having a plurality of table leg connectors to connect one or more additional pairs of tables to each other and to the series.

16. A table benching system comprising:
first and second tables;
each of the first and second tables further comprising at least a first leg and a second leg that are connected to a table top;
first and second elongated foot members;
each of the first and second elongated foot members having opposed ends and further comprising a plurality of table leg connectors spaced apart from each other and spaced inward from the respective opposed ends;
a lower end of the first leg of the first table and a lower end of the first leg of the second table being connected to respective table leg connectors of the first elongated foot member;
a lower end of the second leg of the first table and a lower end of the second leg of the second table being connected to respective table leg connectors of the second elongated foot member;
wherein when the respective lower ends of the legs of the first and second tables are connected to the first and second elongated foot members, the table tops of the first and second tables are positioned parallel to each other;
third and fourth tables;
each of the third and fourth tables further comprising at least a first leg and a second leg that are connected to a table top;
third and fourth elongated foot members;
each of the third and fourth elongated foot members having opposed ends and further comprising a plurality of table leg connectors spaced apart from each other and spaced inward from the respective opposed ends;
a lower end of the first leg of the third table and a lower end of the first leg of the fourth table being connected to respective table leg connectors of the third elongated foot member;
a lower end of the second leg of the third table and a lower end of the second leg of the fourth table being connected to respective table leg connectors of the fourth elongated foot member; and
wherein when the respective lower ends of the legs of the third and fourth tables are connected to the third and fourth elongated foot members, the table tops of the third and fourth tables are positioned parallel to each other.

17. The table benching system of claim 16, wherein each of the first and second elongated foot members further comprises a lower portion that supports the lower end of at least one leg of the first and second tables.

18. The table benching system of claim 16, wherein each of the first and second elongated foot members further comprises at least one elongated stiffening element.

19. The table benching system of claim 16, wherein the lower portion of each of the first and second elongated foot members further comprises two upstanding side walls connected to a lower wall, and each of the first and second elongated foot members further comprises an upper wall connected to the lower portion.

20. The table benching system of claim 19, wherein the upper wall of each of the first and second elongated foot members includes at least two apertures, wherein each aperture receives the lower end of at least one leg of the first or second table.

* * * * *